June 8, 1954     B. H. HUNT, SR., ET AL     2,680,544
FOLDING CARRYING BRACKET
Filed Sept. 4, 1952
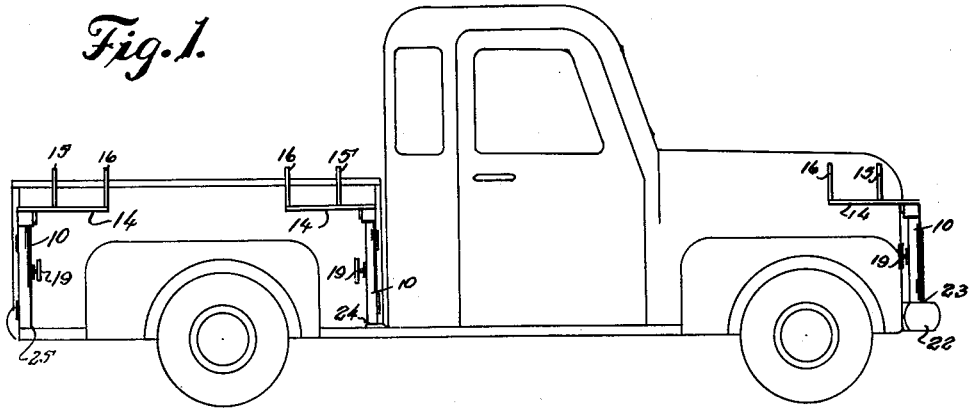
Fig. 1.
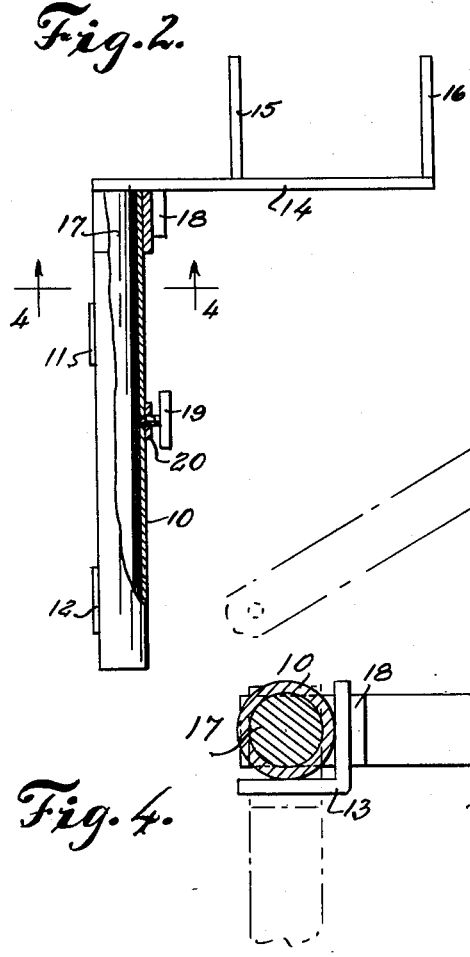
Fig. 2.
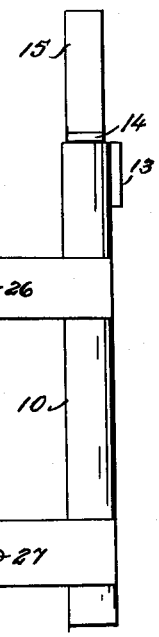
Fig. 3.
Fig. 4.
Benjamin H. Hunt, Sr.    INVENTORS.
C. Ben Hunt, Jr.
BY Victor J. Evans & Co.
ATTORNEYS Patented June 8, 1954

2,680,544

UNITED STATES PATENT OFFICE 2,680,544

FOLDING CARRYING BRACKET

Benjamin H. Hunt, Sr., and Charles Benjamin Hunt, Jr., Walla Walla, Wash.

Application September 4, 1952, Serial No. 307,824

1 Claim. (Cl. 224—42.45)

This invention relates to brackets for carrying pipe, rods, and other devices on the sides of pickup trucks, and in particular a tubular support, a plate having spaced arms extended upwardly therefrom and a stem positioned in the tubular support and on which the plate is mounted wherein with a plurality of the tubular supports mounted on the side of a truck body and with the plates mounted in the supports the plates with the arms extended upwardly therefrom may be turned to positions parallel with the body or extended outwardly therefrom to provide brackets for carrying pipe and the like.

The purpose of this invention is to provide a bracket for carrying long equipment on the sides of trucks wherein the bracket may be folded to an out of the way position when not in use.

Various types of brackets have been mounted on truck bodies particularly of the type used by plumbers for carrying pipe, rods and other products, however, where these brackets extend straight outwardly continuously there is danger of the brackets striking a passing vehicle. With this thought in mind this invention contemplates pipe carrying brackets in which horizontally disposed plates with spaced arms extended upwardly therefrom are mounted by stems in tubular supports that are provided with locking means whereby the plates are adapted to extend outwardly for use and are also adapted to be folded to positions parallel with the body when not in use.

The object of this invention is, therefore, to provide means for mounting a bracket on a truck body whereby the bracket may be folded to a position parallel to the truck body when not in use.

Another object of the invention is to provide a carrying bracket for use on truck bodies in which the bracket may readily be installed on truck bodies now in use.

A further object of the invention is to provide a folding carrying bracket for supporting pipe and the like on truck bodies in which the bracket is of a simple and economical construction.

With these and other objects and advantages in view the invention embodies vertically disposed tubular elements adapted to be mounted on the sides of a pick up truck body and horizontally disposed plates with arms extended upwardly therefrom and stems extended downwardly from one of the ends thereof whereby with the stems positioned in the tubular supports the plates are adapted to move to an angle of 90 degrees so that they may extend outwardly for use or so that they may be folded to positions against the sides of the truck body when not in use.

Other features and advantages of the invention will appear from the following description taken in connection with the drawing, wherein:

Figure 1 is a side elevational view illustrating a truck body with the improved folding brackets thereon and showing the brackets folded against the sides of the truck body.

Figure 2 is a side elevational view illustrating one of the folding brackets with parts broken away, and other parts shown in section and in which the parts are shown on an enlarged scale.

Figure 3 is a front elevational view illustrating a bracket adapted to be mounted on a bumper at the forward end of the truck.

Figure 4 is a section through the tubular support of the bracket being taken on line 4—4 of Fig. 2, with the parts shown on a still further enlarged scale and looking upwardly toward the under surface of the plate of the bracket the outer end of which is broken away.

Referring now to the drawings wherein like reference characters denote corresponding parts the improved pick up truck bracket of this invention includes a tubular post or socket 10 having mounting bars 11 and 12 extended therefrom and an angle 13 on the upper end, and a horizontally disposed plate 14 having spaced arms 15 and 16 extended upwardly therefrom and also having a stem 17 extended downwardly from one end and adapted to be positioned in the socket 10.

The plate 14 is also provided with a lug 18 that is positioned to engage the outer surfaces of the angle 13 for holding the plate in an outwardly extended position or in a folded position, as indicated in Fig. 4.

With the lug 18 against one leg of the angle 13 the bracket is held in a folded position as illustrated in Fig. 1 and when it is desired to turn the bracket to an outwardly extended position the plate 14 is moved upwardly with the lug 18 passing over the upper edge of the angle 13 and after the plate is positioned to extend outwardly it is dropped downwardly whereby the lug 18 is in engagement with the outer surface of the other leg of the angle 13.

The tubular socket 10 is provided with a thumb screw 19 that is threaded into a boss 20 on one side of the tube whereby the stem 17 with the plate 14 may be secured in vertically adjusted positions to compensate for different products being carried by the bracket.

The bracket may also be provided with a brace 21 as indicated in the broken lines in Fig. 3 and with one end of the brace secured to one of the supporting bars 11 or 12 and the opposite end secured to a bumper as indicated by the numeral 22 the tubular socket may be retained in a vertical position. It will be understood that other means may be provided for supporting or bracing the tubular socket whereby it may be secured in an upright position on a truck or the like.

With the parts arranged in this manner the tubular sockets are positioned at the points indicated by the numerals 23, 24, and 25 with the bars 11 and 12 bolted to parts of the body of the vehicle, the bolts passing through openings 26 and 27 in the bars, respectively, or the tubular posts or sockets may be supported by other suitable means.

With the brackets extended rods, pipe, or other products may readily be carried on the sides of the vehicle and when the brackets are not in use they may readily be folded to positions against the side of the vehicle as illustrated in Fig. 1.

It will be understood that modifications, within the scope of the appended claim, may be made in the design and arrangement of the parts without departing from the spirit of the invention.

What is claimed is:

In a carrying bracket for use on a motor vehicle, the combination which comprises a tubular post having plates positioned to form a right angle providing an angle on the outer surface at the upper end and having laterally disposed mounting bars for installing the post in a vertical position on a motor vehicle extended from the lower part, and a plate having spaced upwardly disposed arms extended from the upper surface, a stem extended downwardly from one end, and a lug also extended downwardly from the end on which the stem is positioned and spaced from said stem sufficiently to engage, selectively, either one of the plates of the angle at the upper end of the post whereby with the lug positioned against one of the plates of the angle at the upper end of the post the plate upon which the stem is positioned extends longitudinally of a vehicle upon which the device is mounted and with the lug in engagement with the other of said plates the plate on which the stem is positioned extends laterally of the vehicle.

References Cited in the file of this patent

UNITED STATES PATENTS

| Number | Name | Date |
|---|---|---|
| 2,233,273 | Vincenzo | Feb. 25, 1941 |
| 2,570,802 | Hatteburg | Oct. 9, 1951 |
| 2,637,474 | Vincenzo | May 5, 1953 |